US006838072B1

(12) United States Patent
Kong et al.

(10) Patent No.: US 6,838,072 B1
(45) Date of Patent: Jan. 4, 2005

(54) PLASMA SYNTHESIS OF LITHIUM BASED INTERCALATION POWDERS FOR SOLID POLYMER ELECTROLYTE BATTERIES

(75) Inventors: Peter C. Kong, Idaho Falls, ID (US); Robert J. Pink, Pocatello, ID (US); Lee O. Nelson, Idaho Falls, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 240 days.

(21) Appl. No.: 10/261,675

(22) Filed: Oct. 2, 2002

(51) Int. Cl.[7] .............................. C01D 1/02; H01M 4/52; H01M 4/58; C01G 37/00; C01G 45/00
(52) U.S. Cl. ............................... 423/594.2; 429/231.1; 429/231.3; 423/594.4; 423/594.6; 423/596; 423/599; 423/600; 423/594.15
(58) Field of Search ........................... 429/231.3, 231.1; 423/594.15, 594.2, 594.4, 594.6, 596, 599, 600

(56) References Cited

U.S. PATENT DOCUMENTS

| | | | |
|---|---|---|---|
| 5,378,560 A | * | 1/1995 | Tomiyama .................. 429/217 |
| 5,478,674 A | * | 12/1995 | Miyasaka ................. 429/231.3 |
| 5,531,920 A | | 7/1996 | Mao et al. |
| 5,702,679 A | | 12/1997 | Sheargold et al. |
| 5,707,756 A | * | 1/1998 | Inoue et al. ................... 429/57 |
| 5,879,654 A | | 3/1999 | van Ghemen et al. |
| 6,048,643 A | | 4/2000 | van Ghemen et al. |
| 6,063,142 A | * | 5/2000 | Kawakami et al. ......... 29/623.5 |
| 6,083,644 A | * | 7/2000 | Watanabe et al. ......... 429/231.1 |
| 6,210,834 B1 | * | 4/2001 | Kweon et al. ........... 429/231.3 |
| 6,248,477 B1 | | 6/2001 | Howard, Jr. et al. |
| 6,558,848 B1 | * | 5/2003 | Kobayashi et al. ......... 429/241 |

* cited by examiner

*Primary Examiner*—Wayne A. Langel
*Assistant Examiner*—Jonas N. Strickland
(74) *Attorney, Agent, or Firm*—Brian J. Lally; Daniel D. Park; Paul A. Gottlieb

(57) ABSTRACT

The invention relates to a process for preparing lithium intercalation compounds by plasma reaction comprising the steps of: forming a feed solution by mixing lithium nitrate or lithium hydroxide or lithium oxide and the required metal nitrate or metal hydroxide or metal oxide and between 10–50% alcohol by weight; mixing the feed solution with $O_2$ gas wherein the $O_2$ gas atomizes the feed solution into fine reactant droplets, inserting the atomized feed solution into a plasma reactor to form an intercalation powder; and if desired, heating the resulting powder to from a very pure single phase product.

34 Claims, 9 Drawing Sheets

PLASMA SYNTHESIS OF LITHIUM BASED INTERCALATION POWDERS FOR SOLID POLYMER ELECTROLYTE BATTERIES

U.S. GOVERNMENT RIGHTS

The United States Government has rights in this invention pursuant to Contract No. DE-AC07-941D13223 between the U.S. Department of Energy and Bechtel BWXT Idaho, LLC, representing Idaho National Engineering & Environmental Laboratory.

TECHNICAL FIELD

The invention relates to a process for preparing lithium based intercalation powders. More specifically the invention is a process for producing lithium based intercalation powders with the formulas $LiMO_2$, $LiM_xM'_{1-x}O_2$, $Li_{1+x}Mn_{2-x}O_4$ or $LM_xO_2$ (where M is a transition metal and M'can be a second transition metal or a non-transition metal) for use as cathode materials for solid polymer electrolyte batteries, among other applications.

BACKGROUND OF THE INVENTION

Increased use of portable electronics such as cellular telephones, laptop computers and PDA's over the last several years has increased the demand for compact, low cost, and environmentally friendly rechargeable batteries.

Lithium based Solid Polymer Electrolyte (SPE) batteries have emerged as a forerunner in this growing technology. SPE batteries offer the optimal combination of performance, design flexibility, and safety. SPE batteries use solid lithium based polymers as their electrolyte (in place of traditional liquid electrolyte) sandwiched between a lithium metal sheet and a metal oxide sheet. This laminate construction allows for the creation of batteries which are as thin as a credit card and which can be configured in many different shapes and sizes. The use of a polymer electrolyte is also much safer and more environmentally friendly than traditional battery technologies. Unlike liquid based lithium batteries that use very volatile metallic lithium as their electrolyte, solid polymer batteries use a solid polymer electrolyte that is non-volatile, non-flammable and virtually leakproof since the electrolyte is itself a solid.

Presently, the most attractive cathode (note: the cathode is the negative electrode, however, during recharging operation the polarity switches between the electrodes) materials for use in SPE batteries are Li-based metal oxides such as $LiCoO_2$, $LiNiO_2$, $LiFeO_2$ and $LiMn_2O_4$. These compounds are in a class of compounds known as intercalation compounds which allow the insertion and removal of guest species (especially metal ions) into their crystalline lattice structures. The commercial success of using such compounds as cathode materials, however, hinges upon the discovery of processes that produce intercalation compounds with the required electrochemical performance properties in a reasonable time and at a reasonable cost.

Traditionally, Li-based intercalation compounds have been formed by a mixed oxide process, in which the oxides react at high temperatures to form the desired compound. Typical methods require mixing of solid oxides followed by a high temperature calcination (heating) process in the temperature range of 600–1000° C. Many of these processes also require long heating times in the range of 5 hours to several days and multiple heating and/or grinding steps. (See, van Gehemen et al, U.S. Pat. Nos. 5,879,654 and 6,048,643, Sheargold et al, U.S. Pat. No. 5,702,679, Howard et al., U.S. Pat. No. 6,248,477) The long heating times and multiple grinding steps required by such processes drive up production costs considerably and introduce impurities. There is a need in the art of a synthesis process for Li-based intercalation powders which takes less time and is more cost effective than presently available methods.

OBJECTS OF THE INVENTION

An object of this invention is to provide a method of producing Li-based intercalation powders for use in secondary batteries and other applications;

Another object of this invention is to provide a method of producing U-based intercalation powders in less time;

Another object of this invention is to provide a method of producing Li-based intercalation powders at a lower cost;

DETAILED DESCRIPTION OF THE PREFERRED EMBODIMENTS

Figure 1:
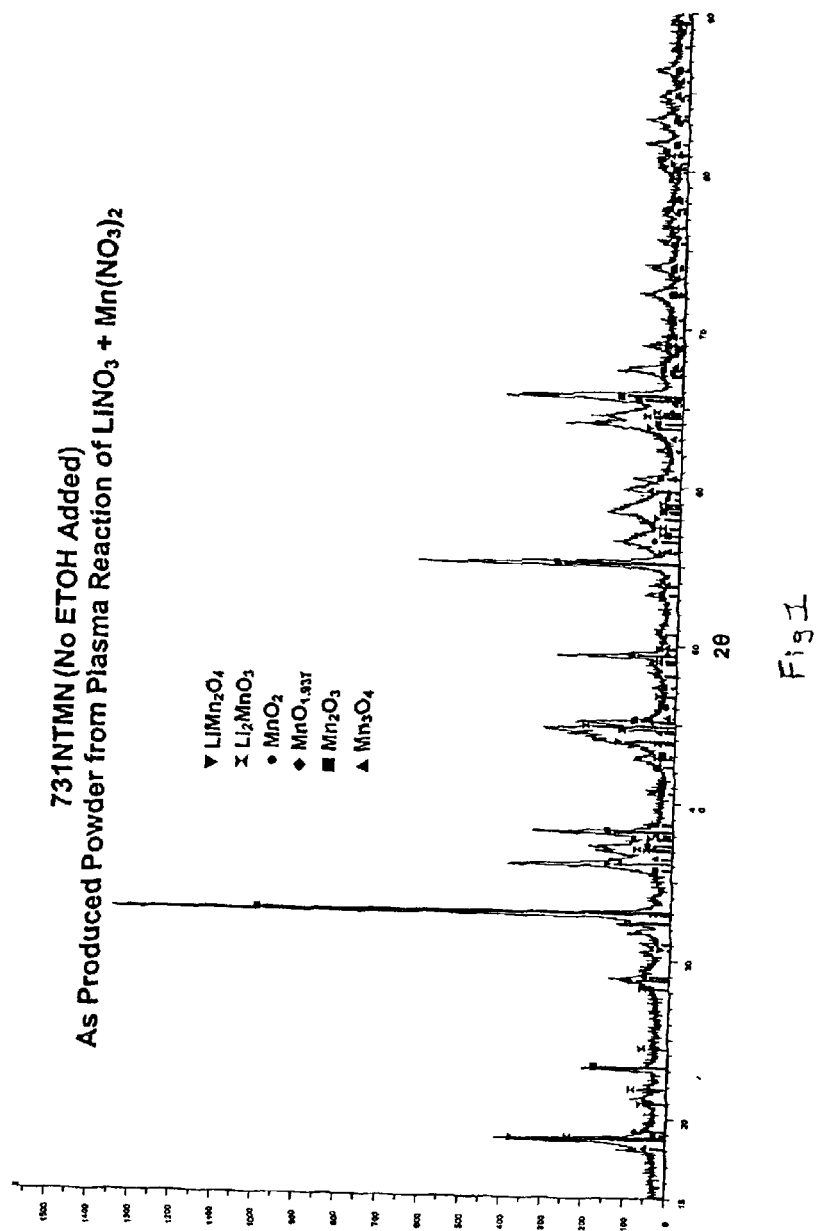
FIG. 1 shows the X-ray diffraction pattern of the powder produced by the plasma reaction of $LiNO_3+Mn(NO_3)_2$.

The present invention discloses a method for preparing Li-based intercalation powders using a plasma powder synthesis reactor. More specifically the invention relates to a process, using a plasma powder synthesis reactor, for the synthesis of intercalation powders with the general formula of $LiMO_2$, $LiM_xM'_{1-x}O_2$, $Li_{1+x}Mn_{2-x}O_4$ or $LM_xO_2$ (where M is a transition metal and M' can be a second transition metal or a non-transition metal), examples include, $LiFeO_2$ $LiCoO_2$, $LiCo_{0.75}Al_{0.25}O_2$, and $LiMn_2O_4$, comprising the process of:

1) forming a feed solution containing stoichiometric amounts of lithium nitrate or lithium hydroxide or lithium oxide and the required transition metal nitrate or metal hydroxide or metal oxide, and between 10–50% alcohol by weight;

2) mixing the feed solution and $O_2$ gas; wherein the $O_2$ gas atomizes the feed solution;

3) inserting the atomized feed solution into the reactive portion of a plasma torch to form an intercalation powder or intercalation powder precursor;

4) collecting the intercalation powder or intercalation powder precursor in a collection chamber;

5) removing the resulting intercalation powder or intercalation powder precursor from the chamber;

6) desired, calcinating (heating) the intercalation powder or intercalation powder precursor to form a purified single phase intercalation product.

The initial step in the present invention involves the preparation of the feed solution for use in a plasma reactor (details of the reactor described later). The preparation of the feed solution is absolutely critical to formation of the desired intercalation compounds using a plasma reactor. The feed solution is prepared by mixing stoichiometric amounts of a lithium nitrate, lithium hydroxide, or lithium oxide and the required transition metal nitrate, metal hydroxide, or metal oxide, and between 10–30% alcohol by weight. For example, the feed solution for the production of the intercalation compound, $LiFeO_2$ would consist of 1 M $LiNO_{3(aq)}$, and 1 M $Fe(NO_3)_{3(aq)}$ and 20% ethanol by weight. The lithium-containing starting material used in the present process was $LiNO_{3(aq)}$, but $LiOH$ or $Li_2O$ could also be used.

The choice of the metal nitrate, metal hydroxide, or metal oxide to be used is dependent upon the type of intercalation compound being produced. Typical metal nitrates used to produce Li-based intercalation compounds include: $Ni(NO_3)_{2(aq)}$, $Co(NO_3)_{2(aq)}$, $Al(NO_3)_{3(aq)}$, $Mn(NO_3)_{2(aq)}$, $Fe(NO_3)_{3(aq)}$, and $Cr(NO_3)_{3(aq)}$, but other metal nitrates with similar chemical properties may be used depending on the powder being produced. An aqueous solution is formed.

Typical metal hydroxides used to form intercalation compounds include: $Ni(OH)_{2(coll)}$, $Co(OH)_{2(coll)}$, $Fe(OH)_{3(coll)}$, $Al(OH)_{3(coll)}$, $Cr(OH)_{3(coll)}$, and $Mn(OH)_{2(coll)}$ but other metal hydroxides with similar chemical properties may be used depending on the circumstances and powder being produced. It should be noted that if a metal hydroxide is utilized in place of a metal nitrate a colloidal solution, not an aqueous solution is formed.

Typical metal oxides used to form intercalation compounds include, $Li_2O$, $CoO$, $Mn_3O_4$, $NiO_2$, $Fe_2O_3$, $Al_2O_3$, and $Cr_2O$, but other metal oxides with similar chemical properties may be used depending on the circumstances and powder being produced. It should be noted that if a metal oxide is use in place of a metal nitrate a colloidal solution, not an aqueous solution is formed.

Figure 2:
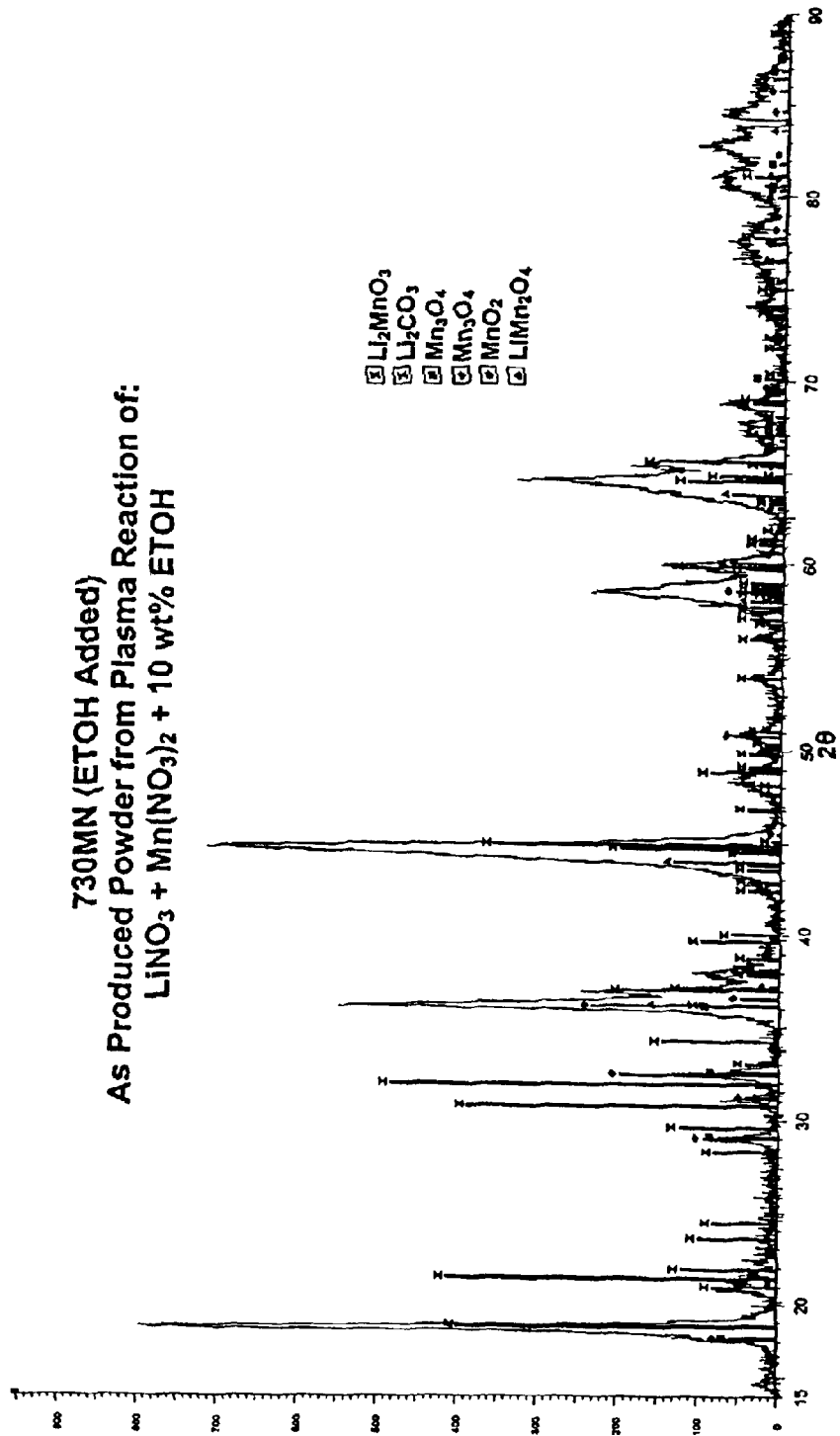
FIG. 2 shows the X-ray diffraction pattern of the powder produced by the plasma reaction of $LiNO_3+Mn(NO_3)_2+10\%$ ethanol by weight.
Figure 3:
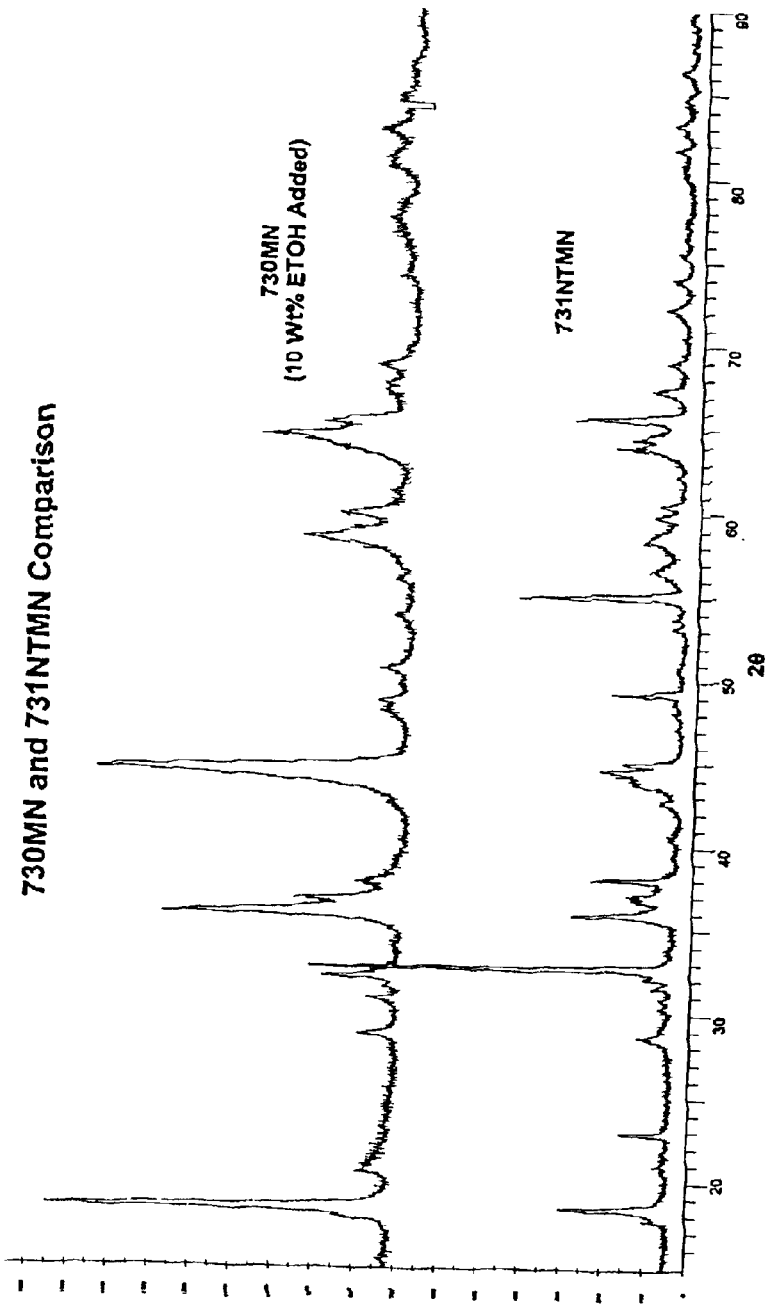
FIG. 3 compares the X-ray diffraction pattern of the powders produced by the plasma reaction of $LiNO_3+Mn(NO_3)_2$ with and without the addition of ethanol.

It is essential that one add (10–30%) alcohol by weight to the solution. Ethanol was used in this particular case, but any other alcohol should produce similar results. The alcohol acts as a catalyst which speeds up the plasma reaction and drives the equilibrium of the reaction toward the intercalation product. The importance of the alcohol addition is illustrated in FIG. 3 which compares the X-ray diffraction patterns of powders produced from the $LiNO_3+Mn(NO_3)_2$ plasma reaction with ethanol and the same reaction without the addition of ethanol. The distinct signal showing the presence of the desired $LiMn_2O_4$ intercalation compound is twice as strong in the powder produced using the ethanol than the powder created without the alcohol addition. (see also, FIGS. 1 and 2)

The next step of the process is to add the feed solution to the plasma reactor. The plasma reactor (FIG. 9A) comprises a dc plasma torch 1, an injection section 2, a reaction chamber 3, and a cyclone powder collector 4 (see FIG. 9A). A laboratory built plasma reactor was utilized but similar reactors with the same basic components could be utilized. The reaction could be scaled for use in an industrial sized plasma reactor for commercial production. An inert gas such as (Ar) is employed as the working gas of the plasma torch.

Figure 9A:
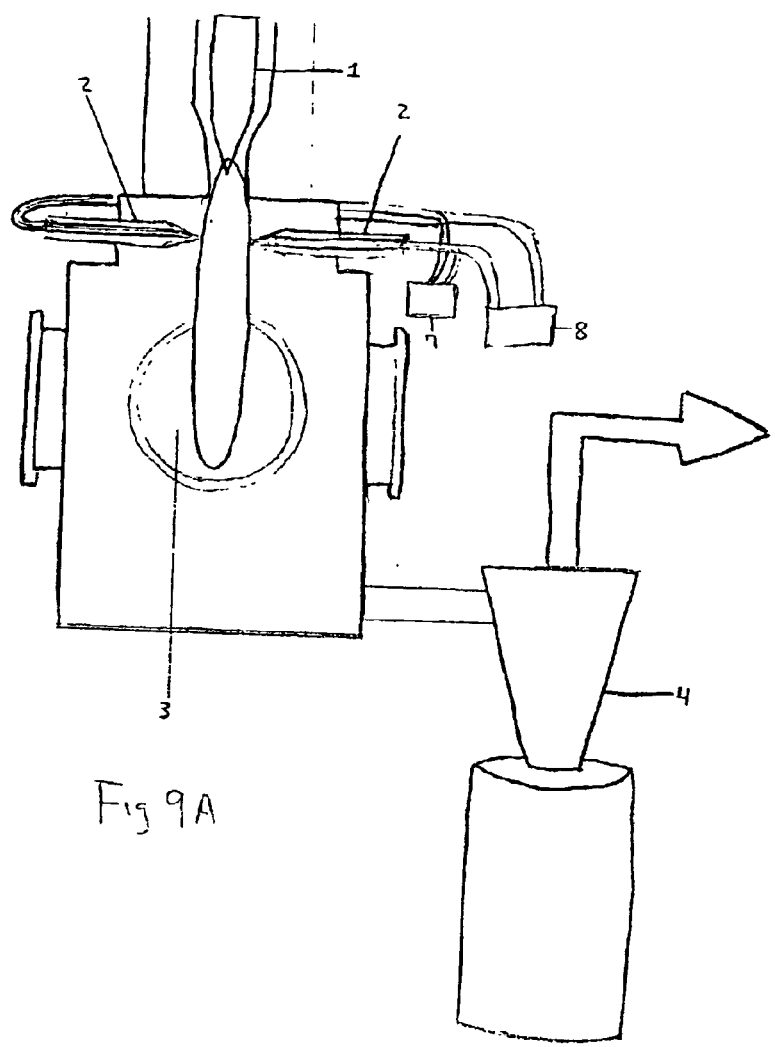
FIG. 9A shows a schematic view of a plasma reactor comprising a dc plasma torch, an injection section, a reaction chamber, and a cyclone powder collector.
Figure 9B:
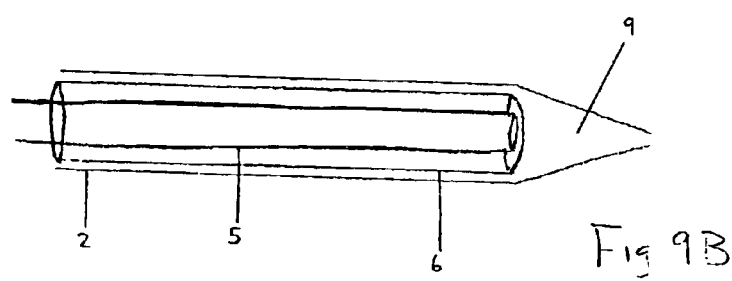
FIG. 9B shows a schematic view of the injection section of the plasma reactor.

Two spray injectors 2 are located near the plasma torch 1 (as illustrated in FIG. 9A) and are used to inject the feed solution into the plasma torch 1. (see, FIG. 9A) Each spray injector 2 (see, FIG. 9B) consists of two concentric tubes that terminate into a common chamber 9. The inner tubes 5 act as transport routes for the feed solution while the outer tubes 6 act as routes for the transport of pressurized $O_2$ gas.

The feed solution is fed through the inner tubes using a liquid feed pump 7. (FIG. 9A) The liquid feed pump 7 used in this embodiment was a Master-Flex liquid feed pump manufactured by Cole-Parmer Instrument Co., 1-800-MASTERFLEX, but other similar feed pumps could be used. Meanwhile the pressurized $O_2$ is fed through outer tube using a mass flow controller 8. The mass flow controller 8 used in this embodiment was purchased from MKS Instruments, 6 Shattuck Road, Andover, Mass. 01810-2449, but other similar mass flow controllers could be employed. As the feed solution exits the inner tubes 5, the feed solution enters a common nozzle 9 where it is mixed with the pressurized 0, gas leaving the outer guide tubes 6. (see, FIG. 9B) In the nozzle 9 the pressurized gas described above is mixed, the $O_2$ gas assisting in atomizing the feed solution into fine reactant droplets which are then propelled (by the pressure of $O_2$ in the outer tubes) into the plasma flame for reaction. Such an arrangement ensures proper mixing between the reactants and the plasma gas.

The plasma torch 1 creates an extremely energetic reaction between the compounds contained in the feed solution which forms an intercalation powder or intercalation powder precursor that collects in the reactor chamber 3. The plasma torch 1 used in this embodiment was a Metco Plasma Spray Gun 9 MB, manufactured by Sulzer-Metco, 1101 Prospect Ave., Westbury, N.Y., 11590, but another similar plasma torch 1 could be used. The intercalation powder or intercalation powder precursor is then removed from the reactor chamber 3. A cyclone collector 4 is attached to the reactor chamber 3 to minimize the loss of fine particles present in the off gas. The results of the plasma reaction can be seen in table 1.

Sample, feed rates, $O_2$ atomizing flow rates, torch Ar flow rates, torch currents and voltages, running times and volumes of feed are located in Table 1. It should be noted that the values in Table 1 are only examples and are not meant to limit the scope of the invention. The Table 1 values may be modified depending on the size of the reactor used, the type of compound being created, and a variety of other factors. That said, the torch current should be at least 200 amps, preferably between 200–1000 amps for a small reactor like the one used in the present invention. The torch voltage should be at least 25 volts, preferably between 25–100 volts for a small reactor like the one used in the present invention.

TABLE 1

| Feed Compositions | Liquid Feed Rate (ml/min) | $O_2$ Atomization Flow Rate (l/min) | Torch Flow Rate (Ar) (ft³/hr) | Torch Current (amps) | Torch voltage (volts) | Run Time (min sec) | Feed Volume (ml) | As produced Products | Heat Treatment Results |
|---|---|---|---|---|---|---|---|---|---|
| 2M $LiNO_3$<br>1M $Ni(NO_3)_2$ | 5 | 22.5 | 80 | 400 | 40 | 14:30 | 55 | NiO, $LiNO_3$, $Ni(NO_3)_2$ | |
| 2M $LiNO_3$<br>1M $Ni(NO_3)_2$<br>50 wt % ETOH | 3 | 22.5 | 80 | 400 | 40 | 17:00 | 50 | NiO, $Li_2CO_3$ | 2 × 8 hrs @ 600° C., progressive formation of $LiNO_2$, still have small amounts of NiO and $Li_2CO_3$ |
| 2M $LiNO_3$<br>2M $Ni(NO_3)_2$<br>20 wt % ETOH | 3 | 25.0 | 80 | 400 | 40 | 10:30 | 30 | NiO, $Li_2CO_3$ | 48 hrs @ 600° C., formation of almost pure $LiNiO_2$ with traces of NiO and $Li_2CO_3$ |
| 1M $LiNO_3$<br>1M $Co(NO_3)_2$<br>20 wt % ETOH | 3 | 25.0 | 80 | 400 | 40 | 27:00 | 81 | $LiCoO_2$, CoO, $Co_3O_4$, $Li_2CO_3$ | 16 hrs @ 600° C., mostly $LiCoO_2$, small amount of CoO and $Li_2CO_3$, longer time and/or higher temperature would completely change to final $LiCoO_2$ product |
| 1M $LiNO_3$<br>0.75M $Co(NO_3)_2$<br>0.25M $Al(NO_3)_3$<br>10 wt % ETOH | 3 | 25.0 | 80 | 400 | 40 | 33:00 | 100 | $LiCoO_2$, CoO, $Co_3O_4$, $Li_2CO_3$, $CoAl_2O_4$ | 40 hrs @ 600° C., formation of pure $LiCo_{0.75}Al_{0.25}O_2$ |
| 1M $LiNO_2$<br>1M $Mn(NO_3)_2$<br>10 wt % ETOH | 3 | 25.0 | 80 | 400 | 40 | 16:30 | 50 | $Mn_2O_3$, $Mn_3O_4$, $MnO_2$, $LiMn_2O_4$, $Li_2CO_3$ | 48 hrs @ 600° C., formation of almost a single phase of $LiMn_2O_4$ with traces of $Mn_2O_3$, $Mn_3O_4$, $MnO_2$ |
| 1M $LiNO_3$<br>1M $Fe(NO_3)_3$<br>20 wt % ETOH | 3 | 25.0 | 80 | 400 | 40 | 16:30 | 50 | $LiFeO_2$, $Li_2Fe_3O_5$, $LiFe_5O_8$, $Fe_2O_3$, $Li_2CO_3$. | 48 hrs @ 600° C., formation of a single phase $LiFeO_2$ |
| 1M $LiNO_3$<br>1M $Cr(NO_3)_3$<br>12 wt % ETOH | 3 | 25.0 | 80 | 400 | 40 | 26:50 | 80 | $LiCrO_2$(major phase), $Cr_2O_3$, $Li_2O$, $Li_2CrO_4$, $LiNO_3$ | |

Figure 7:
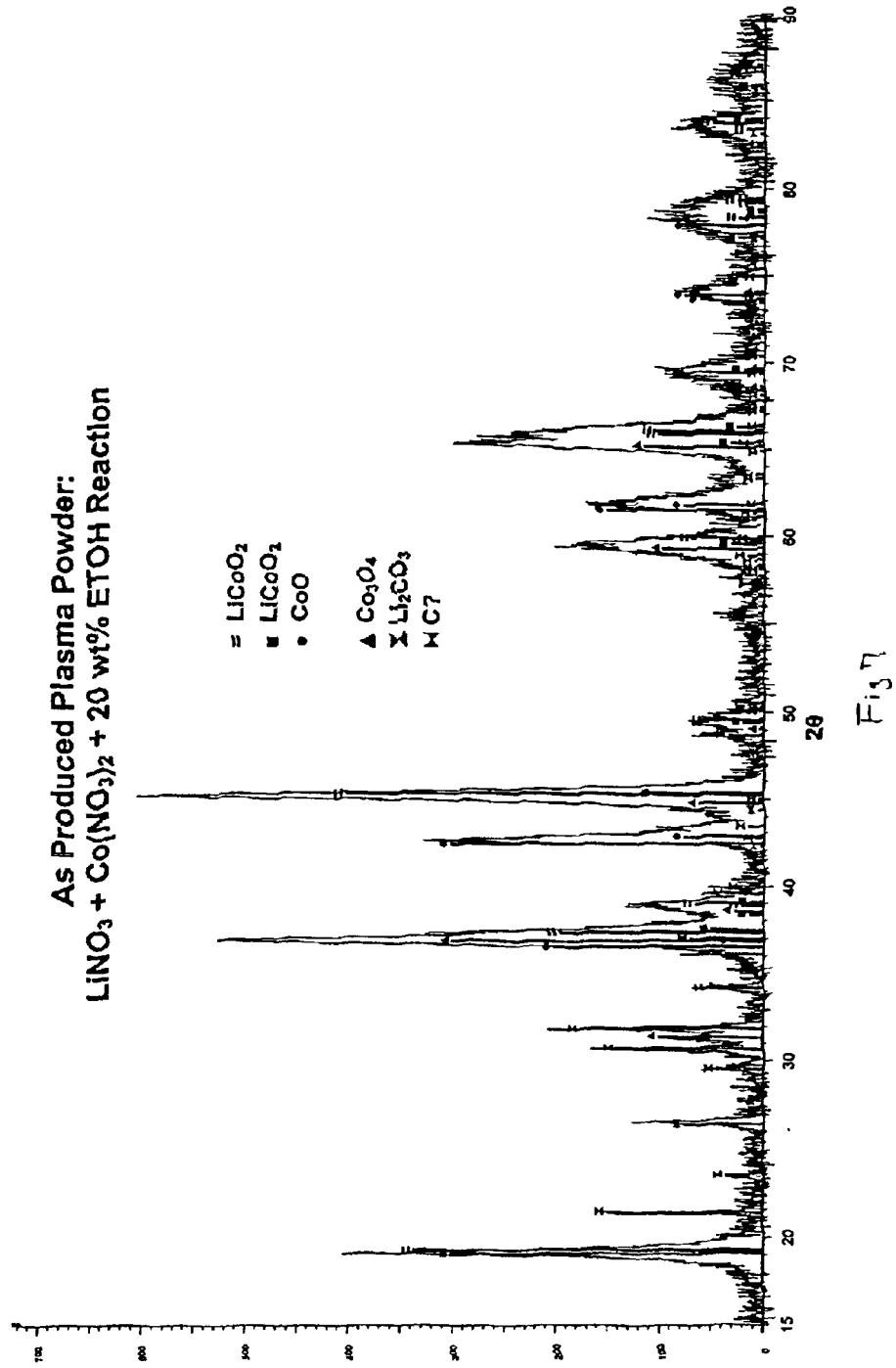
FIG. 7 shows the X-ray diffraction pattern of the powder produced by the plasma reaction of LiNO3+Co(NO3)2+20% ethanol by weight.

The present process is quicker than previous processes because of the use of a plasma torch. The plasma torch causes an ionization reaction that synthesizes intercalation compounds much faster than traditional solid state reactions. Surprisingly, the short plasma reactions produced both intercalation precursors as well as the completed intercalation compounds themselves. (see, table 1) This is especially surprising because of the short amount of time (only minutes) needed to create the intercalation powder. Previous methods of producing Li-based intercalation compounds have required several hours to several days of heating in order to produce the desired compounds. (see, van Ghemen et al., U.S. Pat. No. 5,879,654; Sheargold et al., U.S. Pat. No. 5,702,679; and Manev et al., U.S. Pat. No. 6,280,699) FIG. 7 shows the X-ray diffraction patterns of the compounds produced from the reaction of 1 M $LiNO_3$, 1M $Fe(NO_3)_3$ and 10% by weight ethanol using the present process. It is clear from FIG. 7 that substantial amounts of the intercalation compounds $LiFeO_2$ and $Li_2Fe_3O_5$ were produced using the present process in only 16 minutes and 30 seconds.

Figure 6:
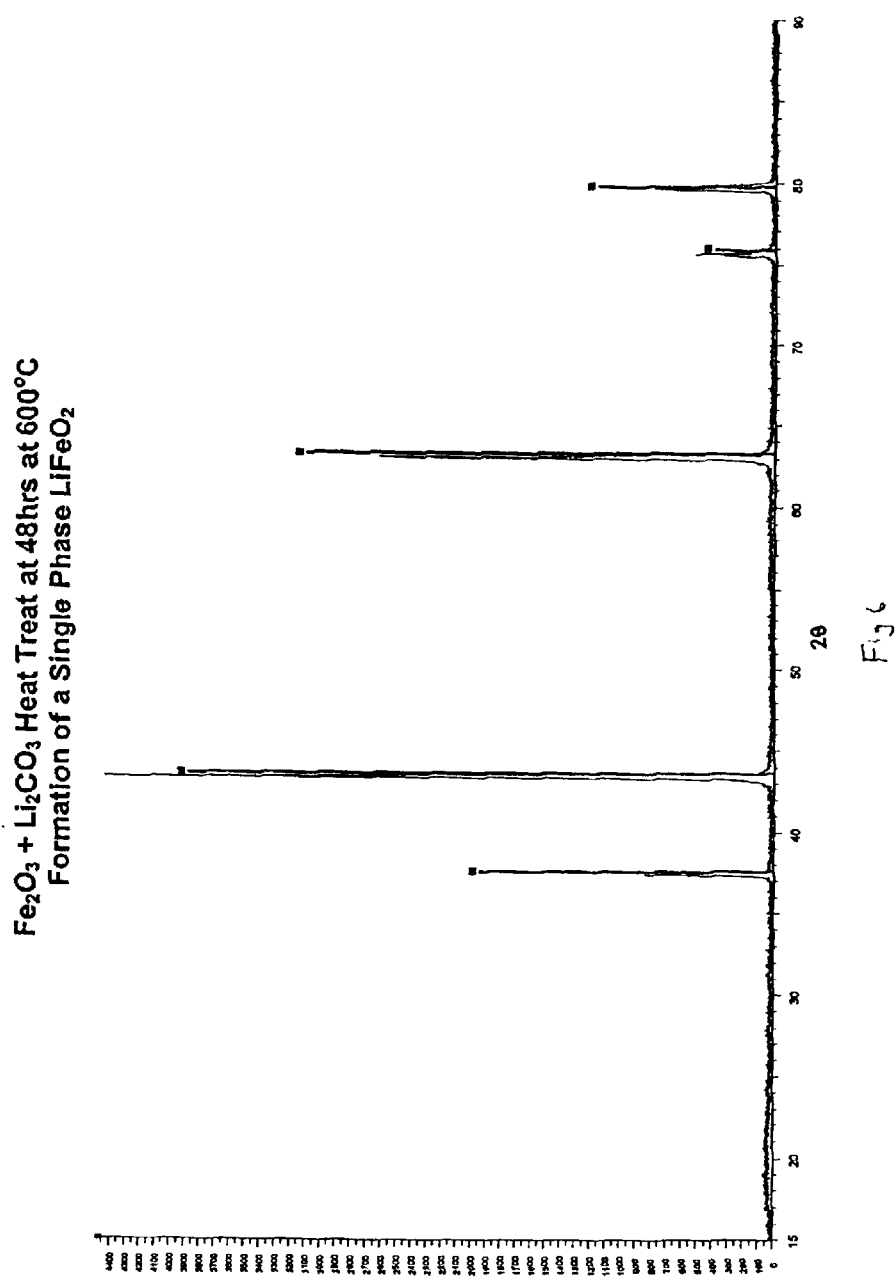
FIG. 6 shows the X-ray diffraction pattern of the powder produced by the plasma reaction of $Fe(NO_3)_3+LiNO_3+20\%$ ethanol by weight, followed by a 48 hour calcination step performed at 600° C.
Figure 8:
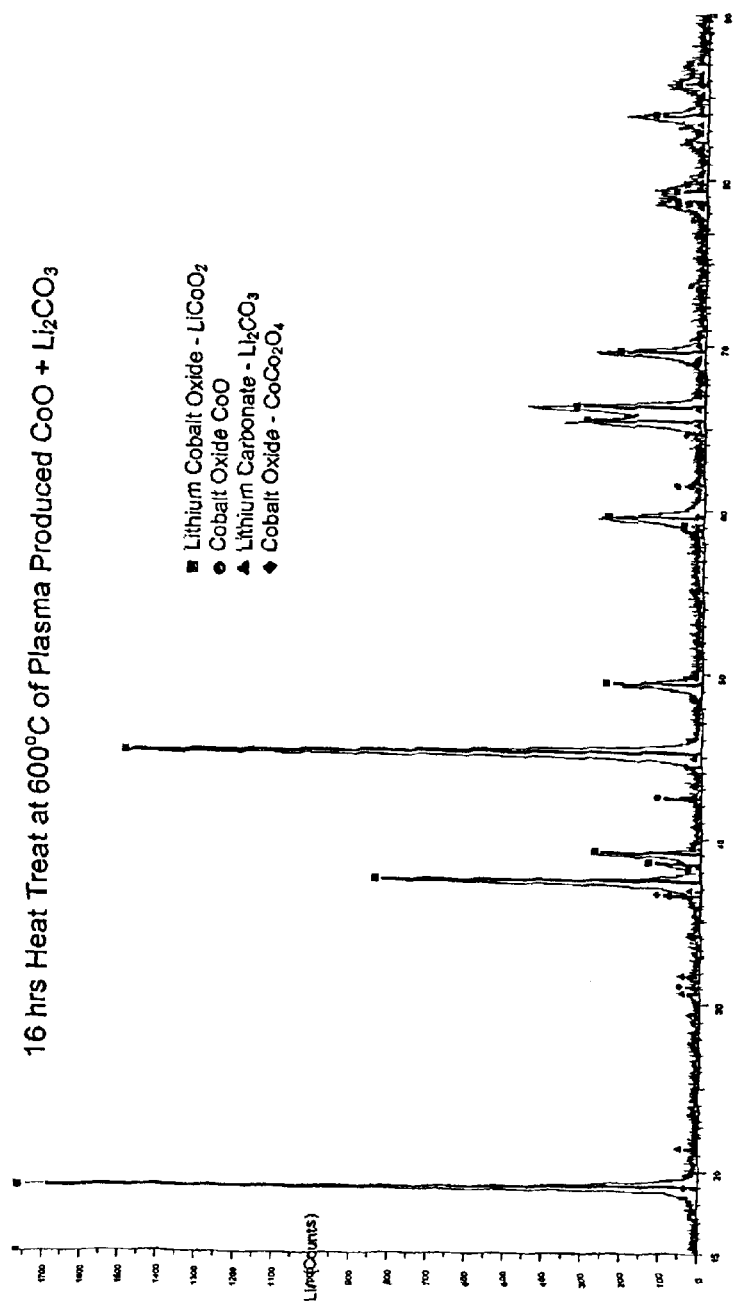
FIG. 8 shows the X-ray diffraction pattern of the powder produced by the plasma reaction of LiNO3+Co(NO3)2+20% ethanol by weight, followed by a 16 hour calcination step performed at 600° C.

The present experiment demonstrates an ability to form intercalation compounds much quicker than previous methods. The present invention produces intercalation powders in 35 minutes compared with the hours or days required by previous processes. The products of the present plasma reaction can be further calcinated (heat treated) to produce very pure, single phase intercalation compounds as shown by FIGS. 8 and 6. This extra purification step may be necessary in situations that require complete conversion to extra pure products.

The additional calcination step is performed at between 600–1000° C. for between 5 and 60 hours depending on the level of purity of the plasma produced starting powder as well as the level of final purity sought. The calcination process is performed in a kiln, rotary kiln or other similar heating apparatus. This additional calcination process helps create a single phase intercalation powder that is purer than the powder resulting from the plasma reaction alone. (see, FIGS. 8 & 6) The following specific examples are to be construed as illustrations and should not be viewed as limiting the scope of the invention.

EXAMPLE 1

Preparation of $LiFeO_2$ from $LiNO_2$ and $Fe(NO_3)_3$

Figure 5:
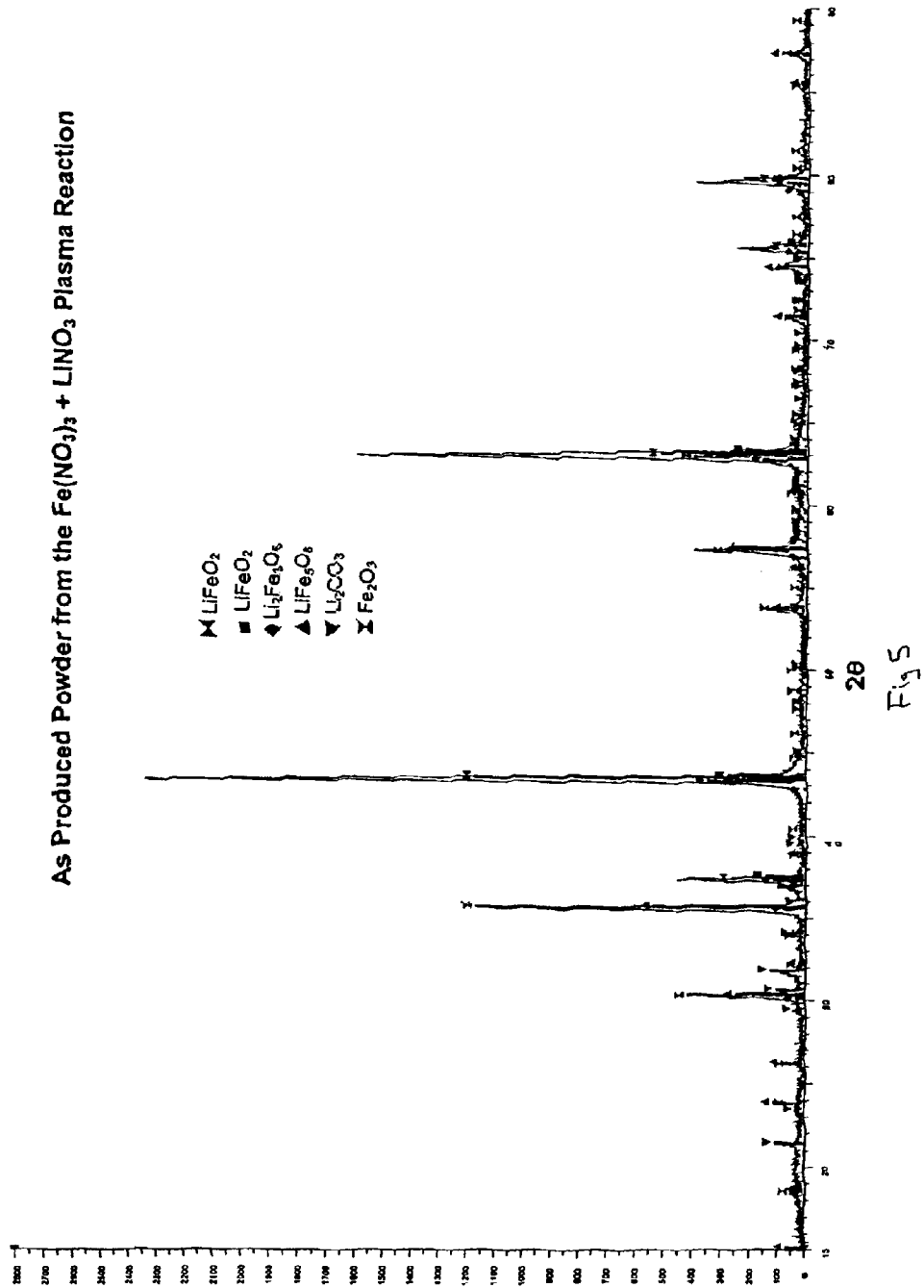
FIG. 5 shows the X-ray diffraction pattern of the powder produced by the plasma reaction of $Fe(NO_3)_3+LiNO_3+20\%$ ethanol by weight.

The process begins with the formation of an aqueous solution consisting of 1M $LiNO_3$ and 1M $Fe(NO_3)_3$, and 20% ethanol by weight. The feed solution is then mixed with $O_2$ gas, wherein the $O_2$ gas atomizes the solution. The atomized feed solution is then sprayed into the plasma torch and the reaction takes place. The resulting powder contains the intercalation compound $LiFeO_2$ in substantial amounts. (see, FIG. 5) The resulting powder mixture can be subsequently calcined for 48 hours at 600° C. to form a purer, single phase compound. The X-ray diffraction pattern of the subsequently calcined powder is shown in FIG. 6.

EXAMPLE 2

Preparation of $LiMn_2O_4$ from $LiNO_3$ and $Mn(NO_3)_2$

Figure 4:
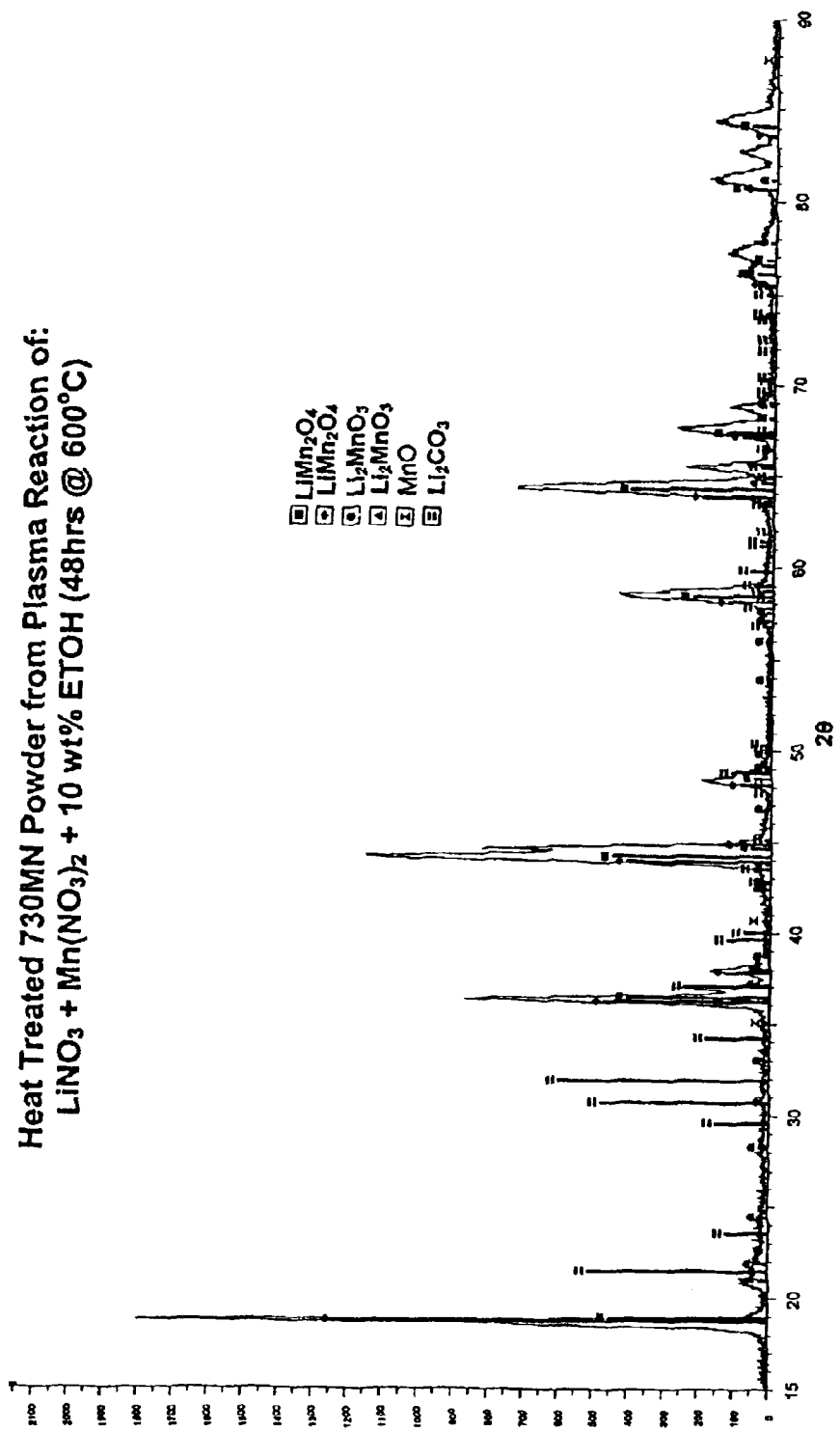
FIG. 4 shows the X-ray diffraction pattern of the powder produced by the plasma reaction of $LiNO_3+Mn(NO_3)_2+10\%$ ethanol by weight, followed by a 48 hour calcination step performed at 600° C.

The process begins with the formation of an aqueous solution consisting of 1M $LiNO_3$, 1M $Mn(NO_3)_2$ and 10% ethanol by weight. The feed solution is then mixed with $O_2$ gas, wherein the $O_2$ gas atomizes the solution. The atomized feed solution is then sprayed into the plasma torch and the reaction takes place. The resulting powder contains the intercalation compound $LiMn_2O_4$ in substantial amounts (see, FIG. 2) The resulting powder mixture can be subsequently calcined for 48 hours at 600° C. to form a purer, single phase product. The X-ray diffraction pattern of the subsequently calcined powder is shown in FIG. 4.

EXAMPLE 3

Preparation of $LiCoO_2$ from $LiNO_3$ and $Co(NO_3)_2$

The process begins with the formation of an aqueous solution consisting of 1M $LiNO_3$, 1 M $Co(NO_3)_2$ and 20% ethanol by weight. The feed solution is then mixed with $O_2$ gas, wherein the $O_2$ gas atomizes the solution. The atomized feed solution is then sprayed into the plasma torch and the reaction takes place. The resulting powder contains the intercalation compound $LiCoO_2$ in substantial amounts. (see, FIG. 7)The resulting powder mixture can be subsequently calcined for 16 hours at 600° C. to form a purer, single phase product. The X-ray diffraction pattern of the subsequently calcined powder is shown in FIG. 8.

The proceeding examples are not meant to limit the scope of the invention and the process can be repeated by altering the reactants and/or operating conditions of the invention.

From the foregoing description, one skilled in the art can easily ascertain the essential characteristics of the present invention and without departing from the spirit and scope of the invention, can make various changes, modifications, and substitutions of the invention to adapt it to various usages and conditions.

We claim:

1. A process for preparing lithium intercalation powders, comprising the steps of:
   a) mixing solutions of a lithium nitrate and a metal nitrate in a stoichiometric ratio corresponding to the desired lithium intercalation powder, and adding between 10–50% alcohol by weight to form a feed solution;
   b) mixing the feed solution with $O_2$ gas, wherein the $O_2$ gas is under pressure, the $O_2$ gas assisting in atomizing the feed solution;
   c) injecting the atomized feed solution into a plasma torch to form an intercalation powder or intercalation powder precursor;
   d) collecting the intercalation powder or intercalation powder precursor in a collection chamber; and
   e) removing the resulting intercalation powder or intercalation powder precursor from the chamber.

2. The process according to claim 1, wherein the lithium nitrate is $LiNO_{3(aq)}$.

3. The process according to claim 1, wherein the metal nitrate is selected from the group consisting of $Ni(NO_3)_{2(aq)}$, $Co(NO_3)_{2(aq)}$, $Al(NO_3)_{3(aq)}$, $Mn(NO_3)_{2(aq)}$, $Fe(NO_3)_{3(aq)}$, and $Cr(NO_3)_{3(aq)}$.

4. The process according to claim 1, wherein the lithium intercalation powder being produced has a formula selected from the group consisting of $LiMO_2$, $LiM_xM'_{1-x}O_2$, $Li_{1+x}Mn_{2-x}O_4$ and $LM_xO_2$, where M is a transition metal and M' is a second transition metal or a non-transition metal.

5. The process according to claim 1, wherein the alcohol is ethanol.

6. The process according to claim 1, wherein the plasma torch uses argon for its working gas.

7. The process according to claim 1, wherein the voltage of the plasma torch is at least 25 volts.

8. The process according to claim 1 wherein the current of the plasma torch is at least 200 amps.

9. The process according to claim 1, further comprising the step of calcinating the resulting intercalation powder or intercalation powder precursor in order to form a single phase product.

10. The process according to claim 9, wherein calcination of the powder is performed at a temperature between 600°–1000° C.

11. The process according to claim 9, wherein calcination of the intercalation powder or intercalation powder precursor is performed for between 5 and 60 hours.

12. A process for preparing lithium intercalation powders, comprising the steps of:
   a) mixing solutions of a lithium hydroxide, and a metal hydroxide in a stoichiometric ratio corresponding to the desired lithium intercalation powder, and adding between 10–50% alcohol by weight to form a feed solution, the solution being under pressure;
   b) mixing the feed solution with $O_2$ gas, wherein the $O_2$ gas is under pressure, the $O_2$ gas assisting in atomizing the feed solution;
   c) injecting the atomized feed solution into a plasma torch to form an intercalation powder or intercalation powder precursor;
   d) collecting the intercalation powder or intercalation powder precursor in a collection chamber; and
   e) removing the resulting intercalation powder or intercalation powder precursor from the chamber.

13. The process according to claim 12, wherein the lithium hydroxide is $LiOH_{(aq)}$.

14. The process according to claim 12, wherein the metal hydroxide is selected from the group consisting of $Ni(OH)_{2(coll)}$, $Co(OH)_{2(coll)}$, $Fe(OH)_{3(coll)}$, $Al(OH)_{3(coll)}$, $Cr(OH)_{3(coll)}$, and $Mn(OH)_{2(coll)}$.

15. The process according to claim 12, wherein the lithium intercalation powder being produced has a formula selected from the group consisting of $LiMO_2$, $LiM_xM'_{1-x}O_2$, $Li_{1+x}Mn_{2-x}O_4$ and $LM_xO_2$, where M is a transition metal and M' is a second transition metal or a non-transition metal.

16. The process according to claim 12, wherein the alcohol is ethanol.

17. The process according to claim 12, wherein the plasma torch uses argon for its working gas.

18. The process according to claim 12, wherein the voltage of the plasma torch is at least 25 volts.

19. The process according to claim 12, wherein the current of the plasma torch is at least 200 amps.

20. The process according to claim 12, further comprising the step of calcinating the resulting intercalation powder or intercalation powder precursor in order to form a single phase product.

21. The process according to claim 20, wherein calcination of the powder is performed at a temperature between 600°–1000° C.

22. The process according to claim 20, wherein calcination of the intercalation powder or intercalation powder precursor is performed for between 5 and 60 hours.

23. A process for preparing lithium intercalation powders, comprising the steps of:
   a) mixing solutions of a lithium oxide, and a metal oxide in a stoichiometric ratio corresponding to the desired lithium intercalation powder, and adding between 10–50% alcohol to form a feed solution, the solution being under pressure;
   b) mixing the feed solution with $O_2$ gas, wherein the $O_2$ gas is under pressure, the $O_2$ gas assisting in atomizing the feed solution;
   c) injecting the atomized feed solution into a plasma torch to form an intercalation powder or intercalation powder precursor;
   d) collecting the intercalation powder or intercalation powder precursor in a collection chamber; and e) removing the resulting intercalation powder or intercalation powder precursor from the chamber.

24. The process according to claim 23, wherein the lithium oxide is $Li_2O$.

25. The process according to claim 23, wherein the metal oxide is selected from the group consisting of $Li_2O$, CoO, $Mn_3O_4$, $NiO_2$, $Fe_2O_3$, $Al_2O_3$, and $Cr_2O$.

26. The process according to claim 23, wherein the lithium intercalation powder being produced has a formula selected from the group consisting of $LiMO_2$, $LiM_xM'_{1-x}O_2$, $Li_{1-x}O_4$ and $LM_xO_2$, where M is a transition metal and M' is a second transition metal or a non-transition metal.

27. The process according to claim 23, wherein the lithium intercalation powder being prepared has a formula selected from the group consisting of $LiNiO_2$, $LiFeO_2$, $LiCoO_2$, $LiCo_{0.75}Al_{0.25}O_2$, and $LiMn_2O_4$.

28. The process according to claim 23, wherein the alcohol is ethanol.

29. The process according to claim 23, wherein the plasma torch uses argon for its working gas.

30. The process according to claim 23, wherein the voltage of the plasma torch is at least 25 volts.

31. The process according to claim 23, wherein the current of the plasma torch is at least 200 amps.

32. The process according to claim 23, further comprising the step of calcinating the resulting intercalation powder or intercalation powder precursor in order to form a single phase product.

33. The process according to claim 32, wherein calcination of the powder is performed at a temperature between 600–1000° C.

34. The process according to claim 32, wherein calcination of the intercalation powder or intercalation powder precursor is performed for between 5 and 60 hours.

* * * * *